US011484387B2

(12) United States Patent
Macri et al.

(10) Patent No.: US 11,484,387 B2
(45) Date of Patent: Nov. 1, 2022

(54) SYSTEM AND METHOD FOR DENTAL SURGICAL GUIDE WITH HYDRAULIC VALVE

(71) Applicants: Christopher James Macri, Greenwood Village, CO (US); Daniel Walden Roberts, Superior, CO (US)

(72) Inventors: Christopher James Macri, Greenwood Village, CO (US); Daniel Walden Roberts, Superior, CO (US)

( * ) Notice: Subject to any disclaimer, the term of this patent is extended or adjusted under 35 U.S.C. 154(b) by 86 days.

(21) Appl. No.: 16/934,309

(22) Filed: Jul. 21, 2020

(65) Prior Publication Data
US 2021/0022830 A1 Jan. 28, 2021

Related U.S. Application Data

(60) Provisional application No. 62/878,721, filed on Jul. 25, 2019.

(51) Int. Cl.
*A61C 1/08* (2006.01)
*A61C 1/00* (2006.01)
(Continued)

(52) U.S. Cl.
CPC ............ *A61C 1/084* (2013.01); *A61C 1/0061* (2013.01); *A61C 13/0004* (2013.01); *A61C 13/0019* (2013.01); *B33Y 80/00* (2014.12)

(58) Field of Classification Search
CPC ....... A61C 1/082; A61C 1/084; A61C 8/0089; A61C 8/009; A61C 17/176
See application file for complete search history.

(56) References Cited

U.S. PATENT DOCUMENTS

| 4,806,099 A * | 2/1989 | Peralta ................. A61C 1/0061 |
| | | 433/28 |
| 7,429,175 B2 | 9/2008 | Gittelson |
| | (Continued) | |

FOREIGN PATENT DOCUMENTS

| KR | 10-1959774 | 3/2019 |
| WO | WO 2015-069012 | 5/2015 |

OTHER PUBLICATIONS

PCT International Search Report for International Application PCT/US2019/043233, search report data dated Nov. 6, 2020 (dated Nov. 6, 2020).

*Primary Examiner* — Cris L. Rodriguez
*Assistant Examiner* — Sydney J Pulvidente
(74) *Attorney, Agent, or Firm* — Law Offices of Daniel W. Roberts; Daniel W. Roberts

(57) ABSTRACT

Provided is a system and method for a dental surgical guide for placing at least one dental implant in a patient's mouth. The surgical guide is a formed prosthesis with a contour to fit upon a patient's teeth. The formed prosthesis providing; at least one guide sleeve disposed in the formed prosthesis and structured and arranged to guide a surgical tool into a patient's jaw at a predetermined location, the guide sleeve defining a tool alignment pathway; at least one irrigant port structured and arranged to receive an irrigant line from a remote irrigant source and conduct the irrigant to a spout disposed proximate to each guide sleeve. A hydraulically activated valve may also be disposed within the spout. An associated method of use is also provided.

26 Claims, 6 Drawing Sheets

(51) Int. Cl.
*A61C 13/00* (2006.01)
*B33Y 80/00* (2015.01)

(56) References Cited

U.S. PATENT DOCUMENTS

| | | | |
|---|---|---|---|
| 8,777,612 | B2 | 7/2014 | Suttin et al. |
| 9,795,458 | B2 | 10/2017 | Llop |
| 10,251,727 | B2 | 4/2019 | Llop |
| 10,517,694 | B2 | 12/2019 | Llop |
| 2005/0115614 | A1* | 6/2005 | Einhaus ............... F04B 53/1002 137/512 |
| 2011/0207084 | A1 | 8/2011 | Kaigler, Sr. |
| 2013/0280673 | A1* | 10/2013 | Maksim ................ A61C 8/008 433/144 |
| 2015/0351866 | A1 | 12/2015 | Thompson, Jr. et al. |

* cited by examiner

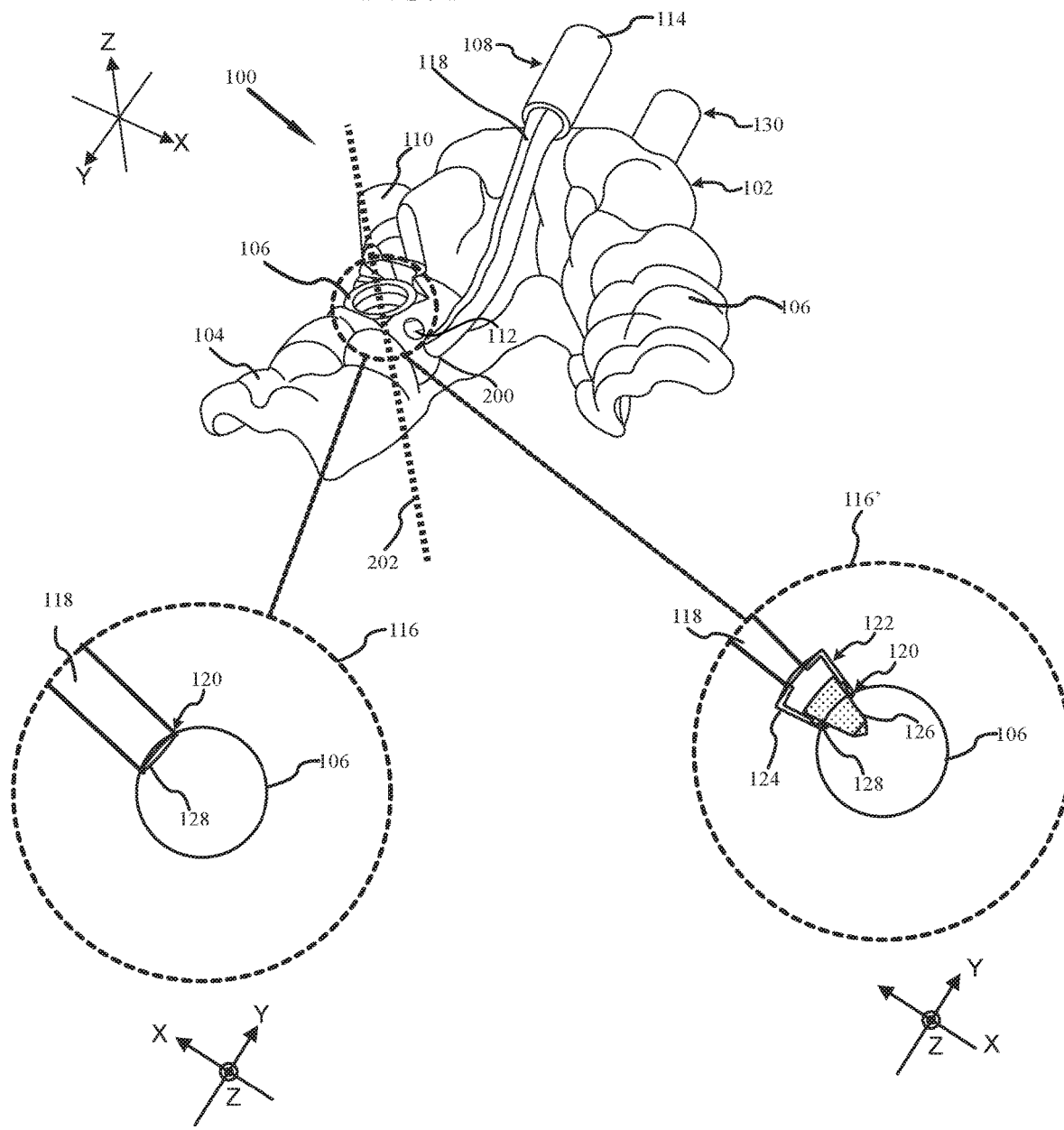

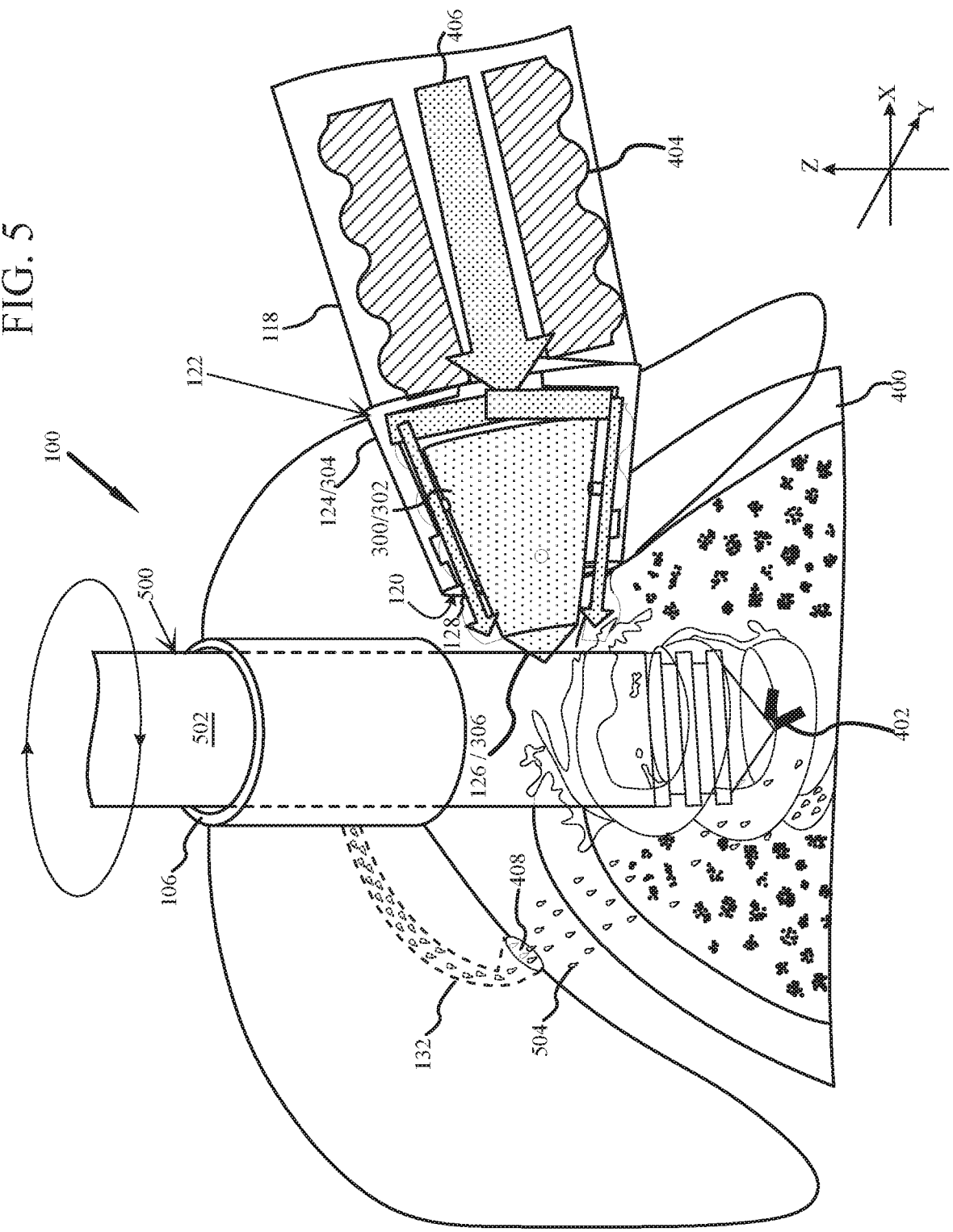

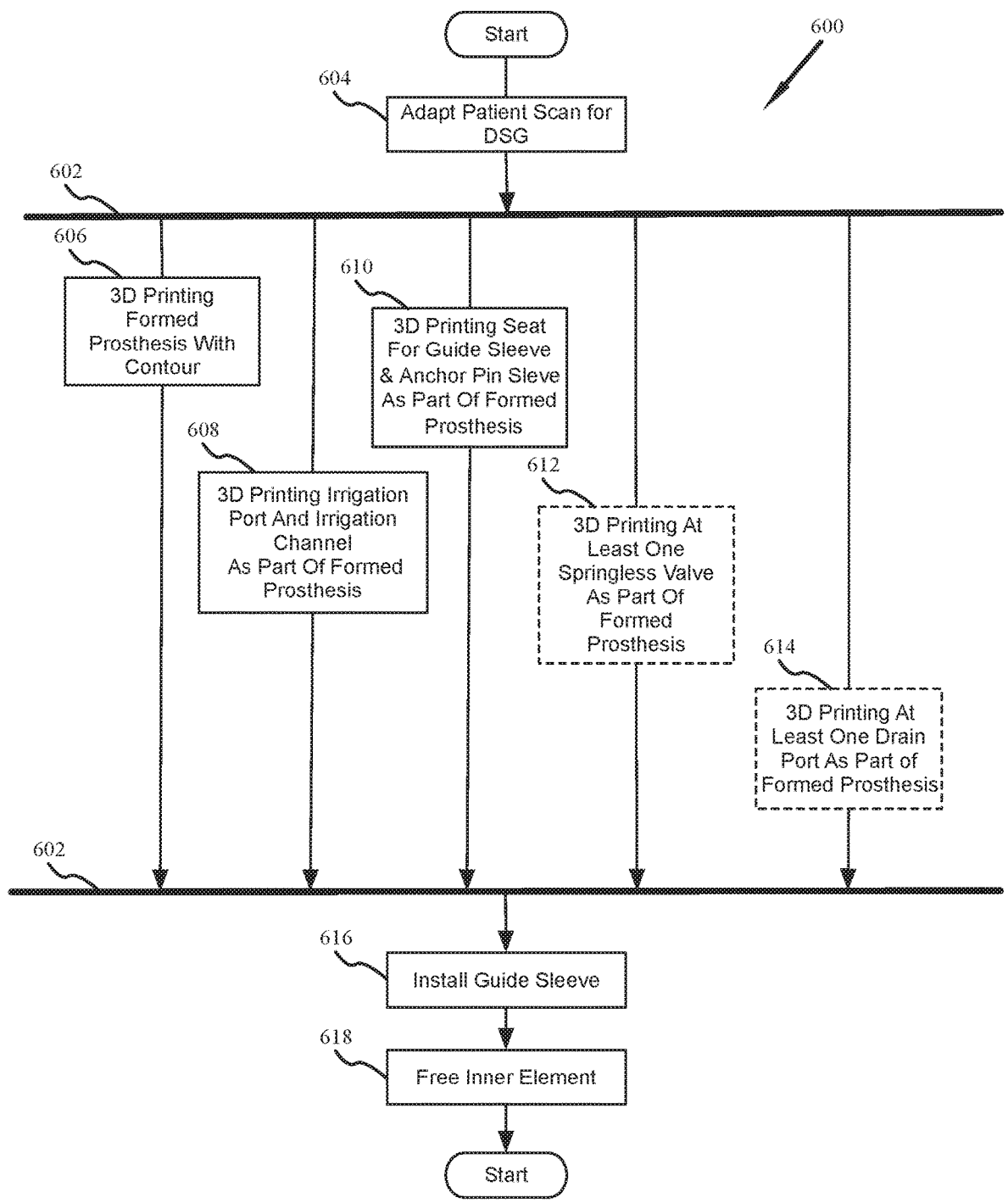

SYSTEM AND METHOD FOR DENTAL SURGICAL GUIDE WITH HYDRAULIC VALVE

CROSS REFERENCE TO RELATED APPLICATIONS

This application claims the benefit under 35 U.S.C. § 119(e) of U.S. Provisional Application No. 62/878,721 filed Jul. 25, 2019 and entitled SYSTEM AND METHOD FOR DENTAL SURGICAL GUIDE WITH HYDRAULIC VALVE, the disclosure of which is incorporated herein by reference.

FIELD OF THE INVENTION

The present invention relates generally to dental surgery, and other surgical settings where irrigation during the surgical process is highly beneficial.

BACKGROUND

Dental implants have become an increasingly popular way to restore missing teeth. A dental implant is a surgical fixture placed within the jawbone. The jawbone fuses or integrates with this fixture over several months. The dental implant can then be used to anchor a crown, bridge, denture or other prosthesis restoring function for the patient.

Many improvements in the techniques utilized to position and place implants have been made. Historically, the position of the dental implant was estimated by the dentist and placed in a location that looked ideal. In this traditional approach, the dentist typically used 2D radiographs and plaster models of the oral cavity to determine their surgical plan. Many dentists still practice this traditional approach.

In recent years, dentists have gained easier access to 3D radiographic imaging and computer planning software. This has greatly improved the precision of the implant placement. Dentists can virtually design the case prior to surgery. They can see and avoid structures which would lead to postoperative complications. Indeed, a dentist is now often able to accurately predict the present and future placement of the implant. Much of the unpredictability is eliminated with this recent technology.

With this new and improved approach, software is used to create a custom resin mouthpiece called a surgical stent. The stent is often fabricated utilizing 3D printing either in a dental laboratory setting or the dentist's own office. The stent fits perfectly in the patient's mouth. Often the stent is further anchored by one or more metal retention pins. These pins are placed into the patient's jawbone and prevent movement of the stent during surgery. The stent includes a guide sleeve for each implant to be placed. The sleeve precisely directs the dentist's instruments and allows for precise placement of the implant.

More specifically, this guide sleeve provides a very specific and dedicated passage way through the surgical stint such that the dentist's surgical tools are presented to a specific and predetermined point, and in a specific and predetermined angle.

The precision in this system has an unintended consequence, which has been proving to be detrimental to some patients, and can result the loss of the implant, if not further creating issues with the underlying bone and surrounding teeth. The intimate contact between the guide and the dentist's drill is necessary to perform the osteotomy (make the hole) at the desired site then place the implant exactly in the desired position.

However, this intimate contact also essentially eliminates the open and easy access to the surgical site. In a freehanded surgery, done without a guide, irrigant—typically sterile water or saline—is sprayed on the site. More specifically, the side is flooded with irrigant and adequately cooled.

With a surgical stent guide securely placed between the irrigant source and the surgery site, adequate irrigation often fails to reach the surgical site. The irrigation is essential in maintaining a cool temperature at the drill/bone interface. When the irrigant is diverted away from the surgery site, the result is thermal damage to the bone and failure of the implant.

In other words, as beneficial as the surgical stent is in providing precise guides to improve the quality and precision of the drilling procedure to place the implant, the robust nature of the surgical stent in encompassing the patient's teeth and gum line so as to provide the stable foundation for the desired alignment has resulted in effectively blocking intended irrigant from reaching, and cooling, the tissues in the surgical site.

Dentists try to overcome this shortcoming with different techniques. One way is to drill a hole in the side of the guide and have an assistant inject irrigant through said hole. This limits the assistant's ability to aid in other parts of the procedure making the surgery more difficult for the dentist.

It should be noted that a small hole is often provided in the standard printed surgical guide as it is used during fabrication of the guide. This hole is an outlet through which excess adhesive is expressed when the metal guide sleeve is inserted into the guide hole during the guide assembly process. After assembly it is filled with cured adhesive and is not utilized in any way for irrigation.

Another compensatory technique is to pump the drill up and down while drilling in an attempt to force as much liquid into the site as possible through hydraulic pressure. Although this can be successful when done correctly, it is very technique sensitive, which can be difficult to develop.

In the absence of adequate irrigation, the bone around the implant undergoes osteonecrosis (bone death). The result is a failure of the implant to properly integrate into the bone. As a result, the implant must be removed and the site repaired. The cost to the patient is additional surgical procedures, cost and pain.

Hence there is a need for a method and system that is capable of overcoming one or more of the above identified challenges.

SUMMARY OF THE INVENTION

Our invention solves the problems of the prior art by providing novel systems and methods to easily and effectively irrigate the surgical site without requiring additional attention from an assistant or modification of the dentist's surgical technique.

In particular, and by way of example only, according to one embodiment of the present invention, provided is a dental surgical guide for placing at least one dental implant in a patient's mouth, including: a formed prosthesis with a contour to fit upon a patient's teeth, the formed prosthesis providing; at least one guide sleeve disposed in the formed prosthesis and structured and arranged to guide a surgical tool into a patient's jaw at a predetermined location, the guide sleeve defining a tool alignment pathway; and at least one irrigant port structured and arranged to receive an irrigant line from a remote irrigant source and conduct the irrigant to a spout disposed proximate to each guide sleeve.

In yet another embodiment, provided is a dental surgical guide for placing at least one dental implant in a patient's mouth, including: a formed prosthesis with a contour to fit upon a patient's teeth, the formed prosthesis providing; at least one guide sleeve disposed in the formed prosthesis and structured and arranged to guide a surgical tool into a patient's jaw at a predetermined location, the guide sleeve defining a tool alignment pathway; an irrigant port structured and arranged to receive an irrigant line from a remote irrigant source and conduct the irrigant to a spout disposed proximate to each guide sleeve; at least one hydraulically activated valve disposed at least partially within the spout and in fluid communication with the irrigant port, the hydraulically activated valve having a housing disposed at least partially within the formed prosthesis and an activator extending from the housing and disposed within the tool alignment pathway, wherein deposition of the surgical tool through the guide sleeve disposes the activator into the housing permitting the flow of irrigant from the irrigant port through the hydraulically activated valve.

For yet another embodiment, provided is a dental surgical guide for placing at least one dental implant in a patient's mouth, including: a surgical template with a contour to fit upon a patient's teeth, the surgical template providing: at least one guide sleeve disposed in the surgical template and structured and arranged to guide a surgical tool into a patient's jaw at a predetermined location, the guide sleeve defining a tool alignment pathway; an irrigant port structured and arranged to receive an irrigant line from a remote irrigant source; at least one springless valve disposed proximate to and below each guide sleeve and in fluid communication with the irrigant port, the springless valve having a housing disposed at least partially within the surgical template with an aperture and an activator protruding from the aperture and partially disposed within the tool alignment pathway, wherein deposition of the surgical tool through the guide sleeve disposes the activator into the housing permitting the flow of irrigant from the irrigant port through the springless valve; and at least one drain port structured and arranged to remove irrigant from below the guide sleeve.

Yet for another embodiment, provided is a method of making a dental surgical guide for placing at least one dental implant in a patient's mouth, including: 3D printing a formed prosthesis with a contour to fit upon a patient's teeth, the formed prosthesis providing: at least one guide sleeve disposed in the formed prosthesis and structured and arranged to guide a surgical tool into a patient's jaw at a predetermined location, the guide sleeve defining a tool alignment pathway; an irrigant port structured and arranged to receive an irrigant line from a remote irrigant source; at least one hydraulically activated valve disposed proximate to each guide sleeve and in fluid communication with the irrigant port, the hydraulically activated valve having a housing disposed at least partially within the formed prosthesis and an activator extending from the housing and disposed within the tool alignment pathway, wherein deposition of the surgical tool through the guide sleeve disposes the activator into the housing permitting the flow of irrigant from the irrigant port through the hydraulically activated valve.

BRIEF DESCRIPTION OF THE DRAWINGS

FIG. 2 is a perspective rear view of a dental surgical guide in accordance with at least one embodiment of the present invention;

FIG. 5 is a conceptual perspective view of the dental surgical guide disposed upon at least a portion of a patients jaw with the hydraulically activated valve/springless valve now open due to the presence of a dental surgical tool disposed thorough the guide sleeve in accordance with at least one embodiment of the present invention; and FIG. 6 is a flow diagram of at least one method of providing a dental surgical guide in accordance with at least one embodiment of the present invention.

DETAILED DESCRIPTION

Figure 1:
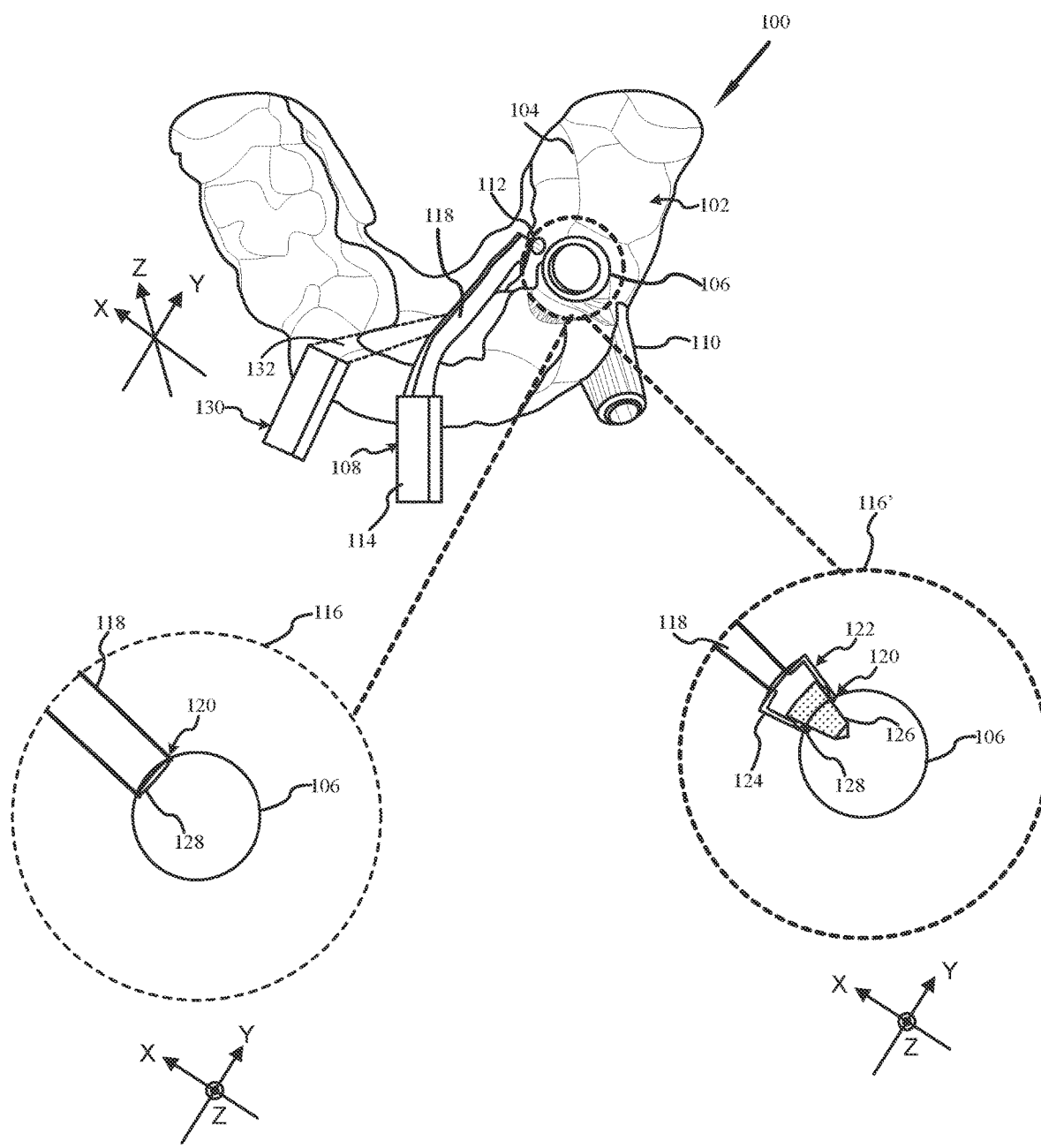
FIG. 1 is a perspective front view of a dental surgical guide in accordance with at least one embodiment of the present invention.

Before proceeding with the detailed description, it is to be appreciated that the present teaching is by way of example only, not by limitation. The concepts herein are not limited to use or application with a specific system or method for dentistry. Thus, although the instrumentalities described herein are for the convenience of explanation shown and described with respect to exemplary embodiments, it will be understood and appreciated that the principles herein may be applied equally in other types of systems and methods involving irrigation through, or with surgical guide masks.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 first appears in FIG. 1.

To briefly summarize, for at least one embodiment the present invention provides a system for a dental surgical guide for placing at least one dental implant in a patient's mouth. The surgical guide is a formed prosthesis with a contour to fit upon a patient's teeth. The formed prosthesis provides at least one guide sleeve disposed in the formed prosthesis and structured and arranged to guide a surgical tool into a patient's jaw at a predetermined location, the guide sleeve defining a tool alignment pathway; and at least one irrigant port structured and arranged to receive an irrigant line from a remote irrigant source and conduct the irrigant to a spout disposed proximate to each guide sleeve. A hydraulically activated valve may also be disposed within the spout.

This summary may be more fully appreciated with respect to the following description and accompanying figures as referenced.

Turning now to the Figures, and more specifically to FIG. 1, there is shown a dental surgical guide 100, (hereinafter DSG 100) as seen in perspective view from above. As is set forth in greater detail below, the DSG 100 essentially comprises a formed prosthesis 102 with a contour 104 to fit upon a patient's teeth, at least one guide sleeve 106 and at least one irrigation port 108, also referred to herein as an irrigant port 108.

To facilitate the description of systems and methods for this DSG 100 the orientation of DSG 100, as presented in the figures, is referenced to the coordinate system with three axes orthogonal to one another as shown in FIG. 1. The axes intersect mutually at the origin of the coordinate system, which is chosen to be the center of DSG 100, however the axes shown in all figures are offset from their actual locations for clarity and ease of illustration.

The DSG 100 may also provide at least one anchor pin sleeve 110 and/or an excess glue vent 112. The irrigation port 108 provides a first end as an attachment end 114 that is structured and arranged to couple to an irrigation source by way of an irrigation line. Those skilled in the art will appreciate that the one or more anchor pin sleeves 110 serve to temporarily affix the DSG 100 within the patients mouth and upon the teeth, and or area of the jaw such that relative movement between the DSG 100 and the jaw, bone and/or other tissues at the operating sight is essentially eliminated.

It will be appreciated that when the DSG 100 is disposed within a patient's mouth, as with a typical dental surgical guide, the tissues and structures of the patients mouth proximate to the surgical site are essentially covered. It will also be apparent that when a surgical tool is disposed within the guide sleeve 106, the surgical area aligned with the guide sleeve 106 will also be essentially covered, now by the surgical tool.

As is shown in greater detail by the enlarged cross section view 116, the irrigant port 108 receives irrigation fluid at the attachment end 114 from the irrigation line and conducts it through a channel 118 to a spout 120 disposed proximate to the guide sleeve 106. For at least one embodiment, the irrigant is sterile water. For at least one alternative embodiment the irrigant is a saline solution.

In varying embodiments, other liquids, suspended and/or dissolved particles, and/or medications may be combined with solutions to provide irrigant appropriate for a given implant surgery without departing from the scope of the teachings herein.

To further assist with this description and ease in appreciating the elements of DSG 100, FIG. 2 presents the DSG 100 as shown in FIG. 1 from a rear perspective. In this orientation, it may be more clearly appreciated that for the exemplary embodiment as shown, the irrigation port 108 traverses across the DSG 100 from the attachment end 114 and enters the sidewall 200 of the DSG 100 proximate to the guide sleeve 106.

The at least one guide sleeve 106 is structured and arranged to guide a dental surgical tool, such as a drill, into a patient's jaw at a predetermined location. The guide sleeve 106 may also be structured and arranged to provide guidance of the surgical tool at a particular angle. Moreover, as may be more fully appreciated in FIG. 2, the guide sleeve 106 defines a tool alignment pathway 202.

As is suggested by the cross section 116, for at least one embodiment the spout 120 is disposed in the side wall of the guide sleeve 106. For yet an alternative embodiment, the spout 120 is disposed below the guide sleeve 106 such that the guide sleeve may remain a continuous sleeve. For yet another alternative embodiment, a portion of the bottom of the guide sleeve 106 may be milled or otherwise formed so as to nest about at least a portion of the spout 120.

As may be appreciated from the illustrations of at least FIG. 1 and especially enlarged cross section view 116, the irrigation port 108 advantageously permits irrigation fluid to be directed to, and localized upon/focused upon, the surgical site when DSG 100 is disposed in a patient's mouth. As the irrigant fluid is also vented from the spout 120 proximate to the surgical tool when such surgical tool is disposed within the guide sleeve 106, the irrigant advantageously cools the surgical tool and is further conducted into and upon the surgical site tissues by the surgical tool.

Moreover, this tubular attachment is in effect a "water port", and conducts water through a fluid pathway that is also formed in the guide to a point proximate to and below/through the guide sleeve 106 as is further described below.

For embodiments where the DSG 100 is 3D printed, it will be understood and appreciated that the irrigant port 108 as consisting of the attachment end 114 for the irrigation line, channel 118 and spout 120 may be readily formed of the same material as the guide. It will also be appreciated that one attachment end for the irrigation line may be branched to a plurality of different channels 118 leading to different guide sleeves 106.

For at least one embodiment, the position of the attachment end 114 of the irrigation port 108 is incisal to the anterior teeth at the midline of the patent's face. The irrigation tube is affixed to this attachment end 114 by friction, a clamp, or simply disposed within the opening of the attachment end 114 in such a manner that irrigation flows directly into it from the irrigation source. As this irrigation tube is attached to the DSG 100, an operator such as a dental assistant is advantageously not required to hold or direct an irrigant jet into the patients mouth, a hole, or around the dentist's tools during the surgical procedure.

The attachment end 114 is connected to one or more hollow tubes, e g channels 118, formed or otherwise provided so as to be at least partially disposed on or within the DSG 100 and conduct the irrigant to one or more implant surgical sites. As the one or more channels 118 are fabricated specifically for each DSG 100, it will be understood and appreciated that they are specifically provided to port irrigant to each surgical implant site defined by the DSG 100 so as to provide adequate irrigation of the site during surgery.

For at least one embodiment, the channel(s) 118 end in open spout(s) 120 disposed proximate to the guide sleeve(s) 106 such that when irrigant is directed into the attachment end 114 of the irrigation port 108 it free flows from the open spout(s) 120 into the surgical site below the DSG 100. This is the exemplary embodiment conceptualized in enlarged cross section 116.

When there is only one surgical guide sleeve 106 starting and stopping the flow of irrigant may not be an issue. However, for a variety of reasons, including but not limited to when there are multiple guide sleeves 106, a free flow state of delivery may not be desired and the present invention may advantageously be adapted to provide irrigant in a controlled flow manner.

Moreover, as shown in enlarged cross section 116' for at least one embodiment, to prevent free flow of the irrigant at other surgical sites, and/or when the tool is not present in the guide sleeve 106, the fluid channel(s) 118 terminate to one or more hydraulically activated valves 122 that are disposed in the DSG 100 proximate to the spout 120.

For at least one embodiment, the one or more hydraulically activated valves 122 are essentially provided by two components, a housing 124 disposed at least partially within the DSG 100, and an activator 126 extending from the housing 124 and into the tool alignment pathway as defined by the guide sleeve 106.

As is further discussed below, for at least one optional embodiment, DSG 100 also provides a drain port 130 for connection to a suction system, the drain port 130 having one or more internal drain channels 132 leading to one or more drains typically located in the underside of DSG 100 (See FIGS. 4 and 5 for conceptual illustrations of drains 408.)

For at least one embodiment, the hydraulically activated valve 122 is a spring-less valve, such as but not limited to a spring-less ball valve. With such an embodiment, the activator 126 extending from the housing is the portion of the ball extending beyond an aperture 128 of the spout 120.

For an embodiment of the present invention where the hydraulically activated valve is a spring-less ball valve, the irrigant port 108 and more specifically the attachment end 114 and channel(s) 118 may be sized so as to permit a user to dispose a ball, such as a stainless steel ball through the aperture of the attachment end 114 and roll it through to mate with the aperture 128 of the spout 120, e.g., the outer shape of the hydraulically activated valve 122.

As the DSG 100 may be 3D printed, for ease of fabrication, and perhaps enhanced activation of the hydraulically activated valve 122, for at least one embodiment the hydraulically activated valve 122 is provided by an inner cone element nested with an outer cone element as is shown in FIGS. 3A, 3B, 3C and 3D depicting a front perspective view, a rear perspective view and a cut through side view of the hydraulically activated valve 122.

More specifically, as shown in FIGS. 3A-3D, for at least one embodiment the hydraulically activated valve 122 is achieved by two concentric shapes, one positioned within the other such that fluid pressure engages at least a portion of inner element 300—the plug 302, with at least a portion of the outer element 304—i.e., the housing 124 which also provides the aperture 128 of the spout 120, to form a seal.

Indeed at least a portion 306 of the inner element 300—or an attachment thereto—extends out beyond the aperture 128 of the outer element 304. This portion 306 is essentially the activator 126 shown in FIGS. 1 and 2 as described above. When the protruding element of portion 306/activator 126 is disposed by pressure backward, or otherwise at least partially unseated from its pressure induced seal with the outer element 304, irrigant is permitted to flow from the hydraulically activated valve 122.

Figure 3A:
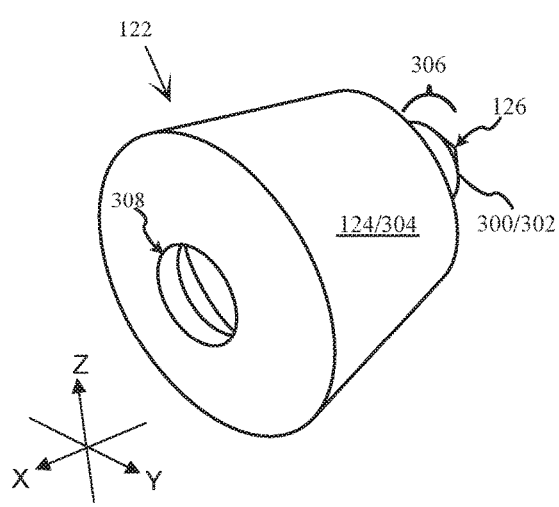
FIGS. 3A, 3B, 3C and 3D present perspective rear, front and cut through views of the hydraulically activated valve/springless valve in accordance with at least one embodiment of the present invention.

In FIG. 3A it may be clearly appreciated that the hydraulically activated valve 122 has an opening 308 which receives irrigant fluid from the channel 118 (not shows). Although the opening 308 may be of varying size, for at least one embodiment the diameter of the opening 308 is selected to be smaller than the diameter of the inner element 300, so that the inner element 300 will not become dislodged from the outer element 304 and perhaps fall back into the channel 118 DSG 100.

Figure 3B:
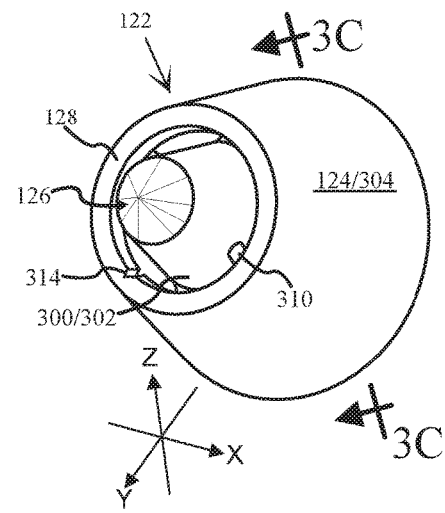
Figure 3C:
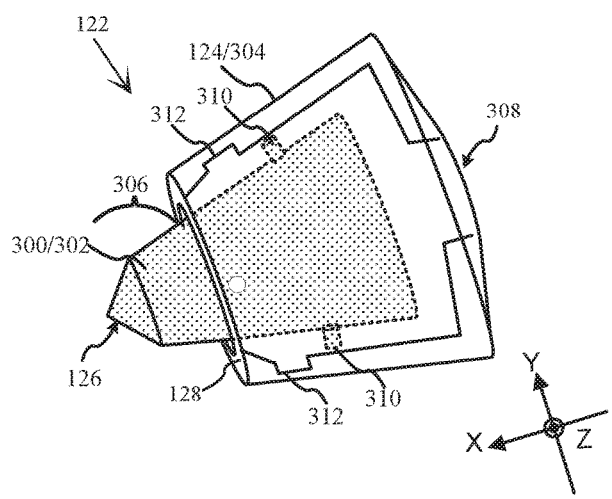

FIG. 3B presents a front view of the hydraulically activated valve 122 more clearly depicting the initial state as provided by 3D printing. Indeed in FIG. 3B, the perspective front view, a forming strut 310 may be appreciated as extending between the inner element 300 and the outer element 304. This may be more fully appreciated in the cut through view provided by FIG. 3C showing the inner element 300 initially held in place and at least temporarily joined to the outer element 304 by two forming struts 310, which permit the 3D printer to print/form both the inner element 300 and the outer element 304. The forming struts 310 are sacrificial legs that may be easily trimmed by the dentist (or laboratory technician) using a traditional dental pick or tool.

As may also be further appreciated in FIG. 3C, an inner radial circumferential groove 312 proximate to the aperture 128 of the outer element 304 may also be established by the 3D printing process so that the remnants of the sacrificial legs do not impinge on the inner surface of the outer element 304 as the inner element 300, e.g. the plug, engages with the aperture 128 or is pressed backwards into outer element 304 so as to open the valve and allow the flow of irrigant.

Figure 3D:
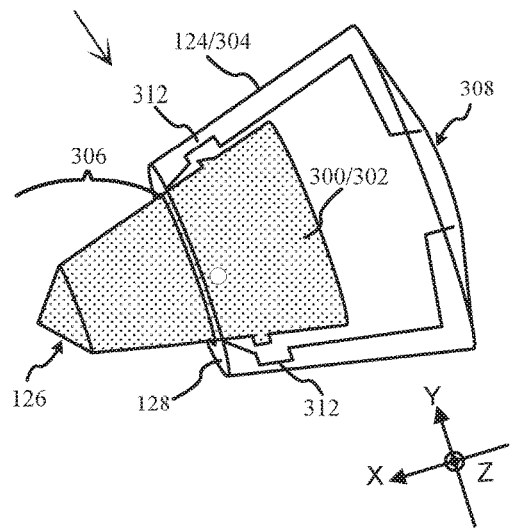

FIG. 3D illustrates the inner element 300 now freed from the forming struts 310, with the remnants of the forming struts 310 harmlessly accounted for within the inner radial circumferential groove 312.

For at least one embodiment, the inner element 300 is formed as a solid element such that irrigant exerts a fluid pressure upon the rear of the inner element 300 to effectuate the hydraulic seal. For at least one alternative embodiment, the rear 314 of the inner element 300 is concave so as to further permit hydraulic pressure to align and seal the inner element 300 against the aperture 128 of the outer element 304.

For at least one embodiment the aperture 128, or at least the inner edging thereof, may be formed with a flexible material such as rubber, silicon, or other compliant material to facilitate the sealing function when the outer element 304 is engaged against the aperture 128. Likewise, at least a portion of the outer surface of the inner element 300 may be formed with, or coated by such flexible material.

It should be understood and appreciated that for at least one the hydraulically activated valve 122 need not be completely fluid tight, thus preventing all irrigant flow. Indeed, some minimal irrigant flow may be desired at all times. As such, for at least one embodiment, the hydraulically activated valve 122 permits an initial flow rate intended to provide low irrigation when surgery is not being performed, and an activated flow rate intended to flush and cool the surgical site during surgery.

For at least one embodiment, such an initial flow rate is provided by the hydraulically activated valve 122 having one or more side channels 314, shown in dotted relief. Moreover, side channel 314 permits a partial flow of irrigant when the inner element 300 is seated against the aperture 128 of the outer element 304. The intended rate of flow may be established by forming side channel(s) 314 with a known depth, width, or circumference to provide a known volume of flow.

It should also be understood and appreciated that with respect to the above discussion of FIGS. 3A-3D, the aperture of the outer element 304 has been described as aperture 128 of the spout 120. It will be understood and appreciated that in varying embodiments, the aperture of the outer element 304 may be inset from aperture 128 of the spout. Moreover, although it may be desired for certain embodiments for the aperture of the outer element 304 and the spout 120 to be the same structure or a combined/composite structure, this is not a requirement for all embodiments of DSG 100.

Figure 4:
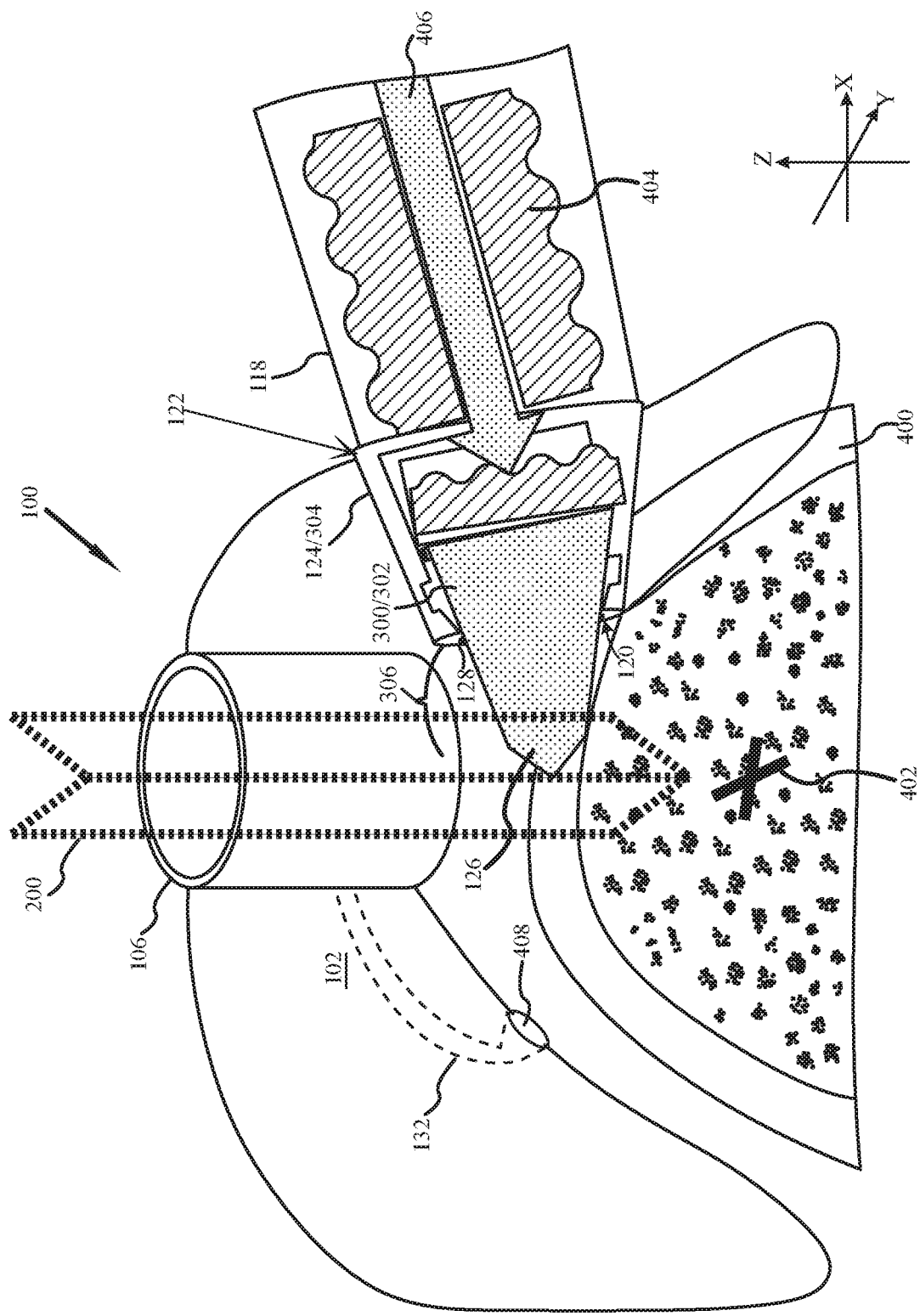
FIG. 4 is a conceptual perspective view of the dental surgical guide disposed upon at least a portion of a patients jaw with the hydraulically activated valve/springless valve closed in accordance with at least one embodiment of the present invention.

Following from the above discussion of the various embodiments for DSG 100, FIGS. 4 and 5 further conceptually illustrate the DSG 100 in application, and more specifically the hydraulically activated valve 122. FIG. 4 illustrates a partial perspective, cut through view of DSG 100 disposed upon a patient's jaw 400. The guide sleeve 106 has established the tool alignment pathway 202 for surgery upon the designated surgical site 402.

As shown in FIG. 4, irrigant 404 has been provided through the irrigant port 108, but for this exemplary embodiment, there is no marginal or initial flow. As may be appreciated, the hydraulic force, represented by arrow 406, is firmly seating the inner element 300 with the aperture, and or areas proximate to the aperture within the outer element 304. As is shown, portion 306, also identified as the distal end of the inner element 300 or a protruding element attached thereto, extends beyond the outer element 304 as the activator 126, and is disposed at least partially in the defined tool alignment pathway 202.

As noted above, with respect to FIGS. 1 and 2, for yet another embodiment, at least one drain port 130 is provided and coupled by at least one drain channel 132 to one or more drains 408 formed in the DSG 100, typically in the underside of the prosthesis 102.

More specifically, during the 3D printing process, one or more additional hollow tubes, i.e., drain channel(s) 132 are provided that essentially run from apertures, such as drain(s) 408 disposed proximate to the surgical site 402 to an exterior connector (not shown) to which a suction line may be attached. Irrigant 404 is then provided to the surgical sight to flush and cool the tissues during the procedure, and then suctioned away without flooding out around the surgical tools and/or DSG 100 and into the patient's mouth.

Activation of the hydraulically activated valve 122 is achieved by a dental surgical tool (e.g., a drill) being disposed through the guide sleeve 106. The activator 126 may also be understood and appreciated as a drill interface because at least the distal end is intended to be contacted—and physically displaced by the drill. It is this displacement by the drill that unseats the inner element 300 from its sealed position with the outer element 304 and permits irrigant 404 to flow.

Moreover, as shown in FIG. 5, a dental surgical tool 500 has been disposed through the guide sleeve 106 and directed upon the surgery site 402. The shaft 502 of the dental surgical tool 500 has displaced the activator 126, which as described above is understood and appreciated to be the protruding portion 306/distal end of inner element 300, back into the outer element 304. As inner element 300 has been displaced from its sealed position with the outer element 304, such as seated against the aperture 128, the irrigant 404 is permitted to flow around the inner element 300 and through the aperture 128 of spout 120 so as to provide cooling irrigation to the surgical site.

As is also shown in FIG. 5, the irrigant 404 is suctioned away through drain 408 and drain channel 132. Although only one drain 408 has been shown for ease of illustration and discussion, it is understood and appreciated that multiple drains 408 may be provided. Indeed, each drain channel 132 may receive waste irrigant 504 from a plurality of drains 408. It will be further understood and appreciated, that as the each drain 408 is formed as a component of DSG 100 and proximate to the surgical site, DSG 100 advantageously permits suction of the waste irrigant 504 and debris away from the surgical site with greater ease than is otherwise may be achieved with a traditional suction line disposed by the doctor and an assistant to areas of the patient's mouth that are not covered by a traditional dental surgical guide.

When the dental surgical tool 500 is removed from the guide sleeve 106, the dental surgical tool 500, and more specifically the shaft 502, no longer displaces the protruding distal end of the inner element 300 or protruding element attached thereto, and the hydraulically activated valve 122 re-seals.

Because of the close and directed application of irrigant 404, DSG 100 provides an advantageous and targeted application of irrigation to maintain a cool temperature at the drill/bone interface, thus minimizing the opportunity for thermal damage to the bone and potential failure of the intended implant. The constant and directed flow of irrigant 404 also continuously washes the surgical site 402, and in so doing continuously removes bone, tissue and fluids providing a cleaner operating environment and less opportunity for debris to foul, gouge or otherwise harm surrounding tissues, the DSG 100 or dental surgical tool 500.

As the shaft 502 of the dental surgical tool 500 is typically round and smooth, and because irrigant is flowing past the inner element 300, abrasive wear of the activator 126 is minimal and hydraulically activated valve 122 is operational for the duration of the surgical procedure.

With respect to FIGS. 4 and 5, it may be appreciated that as it is a portion of the inner element 300, or a protruding element attached thereto, which is disposed into the tool alignment pathway as the activator 126, a typical ball valve may not be ideal in some embodiments as the distance of protrusion beyond the outside of the aperture provided by the outer element 304 is dictated by the radius of curvature of the ball. In addition, 3D printing of a ball element may not be as consistent as another structure, such as a cone.

As has been described above, for at least one embodiment, the DSG 100, irrigant port 108, the hollow irrigant channels 118, and the inner and outer elements of the hydraulically activated valve 122 are all 3D printed. For at least one embodiment, the same printing material is used for all elements.

For at least one alternative embodiment, the inner element 300 of the hydraulically activated valve 122 or at least the protruding distal end is fabricated from a different printing material so as to be more resistant to the friction imparted by the rotating surgical tool 500 disposed through the guide sleeve 106. Indeed, in varying embodiments this alternative material may be selected to be harder, softer, more resilient then the material providing other elements of the guide. For yet one embodiment, this material may incorporate a friction reducing substance such as Teflon, also known as a polymer of tetrafluroethylene.

In other words, to summarize the above, the position of the hydraulically activated valve 122 relative to the guide sleeve 106 is designed in such a manner such that the activator 126 associated with the inner element 300 extends into the path of the surgical tool 500 when under pressure by the irrigant supply. It is held here by the hydraulic pressure. When the dentist places a surgical tool 500 through the guide sleeve 106, the path of the surgical tool 500 dictated by the guide sleeve 106 puts the surgical tool 500 in contact with the activator 126. The surgical tool's presence causes the activator 126 to be pressed back into the outer element 304 and the irrigant 404 is permitted to flow around the inner element 300, through the aperture 128 of spout 120, and flood the surgical site.

In yet another embodiment, the dentist may desire an unimpeded flow of irrigant to the surgical site. In such case the hydraulically activated valve 122 would be omitted from the design and the channel 118 terminating at spout 120 would empty directly onto the surgical below the guide sleeve.

Having described the physical structure of the guide, e.g., the formed prosthesis, it should be understood and appreciated that the present teaching also provides at least one method for providing DSG 100.

It will be appreciated that the described method(s) need not be performed in the order in which it is herein described, but that this description is merely exemplary of one method of providing at least one embodiment of DSG 100 as shown and described above.

Turning now to FIG. 6, there is shown method 600 for providing a DSG 100. As this method is implanted with the use of a 3D printer, it will be understood and appreciated that as 3D printing traditionally involves establishing layer upon layer of material and/or materials, different elements of the overall structure may be formed before or after other elements, as well as contemporaneously. As such, FIG. 6 has been illustrated with the majority of actions shown between parallel lines 602 to indicate that in varying embodiments one or more actions may occur simultaneously. The hierarchy of each action with respect to another is not necessarily indicative of precedence, but has been chosen for ease of illustration and discussion.

For at least one embodiment, method 600 is initiated by adapting a patient scan for an embodiment of DSG 100, block 604. More specifically, the dentist/technician/operator will receive a 3D scan of the contour of the patient's mouth and establish a general prosthesis for surgery via software image editing tools common to the dental industry such as Blue Sky Bio, available from Blue Sky Bio, LLC having an address of 800 Liberty Drive, Libertyville, Ill. 60048 (https://blueskybio.com), or Nobel Clinician available from DTX Studio (https://www.dtxstudio.com/content/dtx/us/en/home.html).

This general prosthesis printing model is then enhanced to become DSG 100 by specifying at least one irrigation port 108, the option of at least one springless valve 122, and the option of at least one drain 408. With these advantageous enhancements adapted to the patient scan, the 3D printing process is initiated, shown in FIG. 6 as the actions within parallel lines 602.

Moreover, method 600 continues with the printing of the formed prosthesis with contour 104, block 606. Method 600 also includes 3D printing of at least one irrigation port 108, block 608 and the printing of at least one seat for a guide sleeve 106 and the anchor pin sleeve 110, block 610. For at least one embodiment the DSG 100 is 3D printed with an SLA printer such as Moonray, Formlabls or other commercially available SLA printer using dental specific resin.

As described above, for at least one embodiment, at least one optional springless valve 122 is desired, and as such method 600 continues with the 3D printing of such a springless valve as part of the formed prosthesis, optional block 612. Method 600 may also include the option of 3D printing at least one drain 408, optional block 614.

With the 3D printing completed, the metal guide sleeve 106 is installed upon the established seat, block 616. A metal guide sleeve may also be installed for the anchor pin sleeve. For an embodiment with at least one valve 122, the inner element 300 is freed by an operator with a pick or other suitable instrument used to sever the forming struts 310, block 618

Changes may be made in the above methods, systems and structures without departing from the scope hereof. It should thus be noted that the matter contained in the above description and/or shown in the accompanying drawings should be interpreted as illustrative and not in a limiting sense. Indeed, many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A dental surgical guide for placing at least one dental implant in a patient's mouth, comprising:
   a formed prosthesis with a contour to fit upon a patient's teeth, the formed prosthesis providing;
      at least one guide sleeve disposed in the formed prosthesis and structured and arranged to guide a surgical tool into a patient's jaw at a predetermined location, the guide sleeve defining a tool alignment pathway; and
      at least one irrigant port structured and arranged to receive an irrigant line from a remote irrigant source providing an irrigant and conduct the irrigant to a spout disposed proximate to each guide sleeve, the spout gated by a hydraulically activated valve.

2. The dental surgical guide of claim 1, wherein the hydraulically activated valve has a housing disposed at least partially within the formed prosthesis and an activator extending from the housing and disposed within the tool alignment pathway, wherein deposition of the surgical tool through the guide sleeve disposes the activator into the housing permitting the flow of the irrigant from the irrigant port through the hydraulically activated valve.

3. The dental surgical guide of claim 1, further including at least one drain port structured and arranged to remove the irrigant from below the guide sleeve.

4. A dental surgical guide for placing at least one dental implant in a patient's mouth, comprising:
   a formed prosthesis with a contour to fit upon a patient's teeth, the formed prosthesis providing;
      at least one guide sleeve disposed in the formed prosthesis and structured and arranged to guide a surgical tool into a patient's jaw at a predetermined location, the guide sleeve defining a tool alignment pathway;
      an irrigant port structured and arranged to receive an irrigant line from a remote irrigant source providing an irrigant and conduct the irrigant to a spout disposed proximate to each guide sleeve; and
      at least one hydraulically activated valve disposed at least partially within the spout and in fluid communication with the irrigant port, the hydraulically activated valve having a housing disposed at least partially within the formed prosthesis and an activator extending from the housing and disposed within the tool alignment pathway, wherein deposition of the surgical tool through the guide sleeve disposes the activator into the housing permitting the flow of the irrigant from the irrigant port through the hydraulically activated valve.

5. The dental surgical guide of claim 4, wherein the housing is formed of the same material providing the formed prosthesis.

6. The dental surgical guide of claim 4, wherein the formed prosthesis is formed of a first material and the housing of the hydraulically activated water valve is formed of a second material.

7. The dental surgical guide of claim 4, wherein the formed prosthesis is formed of a first material and at least a portion of the activator is formed of a second material.

8. The dental surgical guide of claim 4, wherein the hydraulically activated valve is a spring-less ball valve.

9. The dental surgical guide of claim 4, wherein the housing is structured and arranged to define an inner cone shape, the activator provided by an inner plug nested within and conforming to the inner cone shape.

10. The dental surgical guide of claim 9, wherein the inner plug is substantially cone shaped.

11. The dental surgical guide of claim 9, wherein the inner plug is substantially a ball.

12. The dental surgical guide of claim 4, wherein the activator is provided by an inner plug generally having a cone shape, a distal end of the inner plug extending from an aperture of the housing as the activator.

13. The dental surgical guide of claim 4, further including at least one anchor pin sleeve structured and arranged to receive an anchor pin to temporarily affix the formed prosthesis within the patient's mouth.

14. The dental surgical guide of claim 4, wherein the irrigant is water.

15. The dental surgical guide of claim 4, wherein the irrigant is saline.

16. The dental surgical guide of claim 4, further including at least one drain port structured and arranged to remove the irrigant from below the guide sleeve.

17. A dental surgical guide for placing at least one dental implant in a patient's mouth, comprising:
- a surgical template with a contour to fit upon a patient's teeth, the surgical template providing;
  - at least one guide sleeve disposed in the surgical template and structured and arranged to guide a surgical tool into a patient's jaw at a predetermined location, the guide sleeve defining a tool alignment pathway;
  - an irrigant port structured and arranged to receive an irrigant line from a remote irrigant source providing an irrigant;
  - at least one springless valve disposed proximate to and below each guide sleeve and in fluid communication with the irrigant port, the springless valve having a housing disposed at least partially within the surgical template with an aperture and an activator protruding from the aperture and partially disposed within the tool alignment pathway, wherein deposition of the surgical tool through the guide sleeve disposes the activator into the housing permitting the flow of the irrigant from the irrigant port through the springless valve; and
  - at least one drain port structured and arranged to remove the irrigant from below the guide sleeve.

18. The dental surgical guide of claim 17, wherein the hydraulically activated valve is a spring-less ball valve.

19. The dental surgical guide of claim 17, wherein the housing is structured and arranged to define an inner cone shape, the activator provided by an inner plug nested within and conforming to the inner cone shape.

20. The dental surgical guide of claim 19, wherein the inner plug is substantially cone shaped.

21. The dental surgical guide of claim 19, wherein the inner plug is substantially a ball.

22. The dental surgical guide of claim 17, wherein the activator is provided by an inner plug generally having a cone shape, a distal end of the inner plug extending from an aperture of the housing as the activator.

23. The dental surgical guide of claim 17, further including at least one anchor pin sleeve structured and arranged to receive an anchor pin to temporarily affix the formed prosthesis within the patient's mouth.

24. The dental surgical guide of claim 17, wherein the irrigant is water.

25. The dental surgical guide of claim 17, wherein the irrigant is saline.

26. The dental surgical guide of claim 17, further including at least one drain port structured and arranged to remove the irrigant from below the guide sleeve.

* * * * *